United States Patent
Trowbridge et al.

(10) Patent No.: US 8,305,488 B2
(45) Date of Patent: Nov. 6, 2012

(54) TIME-SLICED MULTIPLEXED IMAGE DISPLAY

(75) Inventors: Scott R. Trowbridge, Windmere, FL (US); Steven C. Blum, Orlando, FL (US); Justin Michael Schwartz, Orlando, FL (US); Brian McQuillian, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1558 days.

(21) Appl. No.: 11/565,185

(22) Filed: Nov. 30, 2006

(65) Prior Publication Data

US 2007/0266412 A1 Nov. 15, 2007

Related U.S. Application Data

(60) Provisional application No. 60/799,298, filed on May 10, 2006.

(51) Int. Cl.
*H04N 7/12* (2006.01)
*H04N 13/04* (2006.01)
(52) U.S. Cl. ................ 348/387.1; 348/56
(58) Field of Classification Search .............. 725/131, 725/90; 348/56, 483, 387.1; 345/764, 629
See application file for complete search history.

(56) References Cited

U.S. PATENT DOCUMENTS

| | | |
|---|---|---|
| 2,832,821 A | 4/1958 | Du Mont |
| 4,424,529 A | 1/1984 | Roese et al. |
| 4,562,463 A | 12/1985 | Lipton |
| 4,847,690 A * | 7/1989 | Perkins .......................... 348/483 |
| 5,117,302 A | 5/1992 | Lipton |
| 5,537,476 A | 7/1996 | Coteus |
| 5,619,219 A | 4/1997 | Coteus |
| 5,847,771 A | 12/1998 | Cloutier et al. |
| 5,963,371 A | 10/1999 | Needham et al. |
| 5,969,767 A | 10/1999 | Ishikawa et al. |
| 6,188,442 B1 | 2/2001 | Narayanaswami |
| 6,359,664 B1 | 3/2002 | Faris |
| 6,377,230 B1 | 4/2002 | Yamazaki et al. |
| 6,456,432 B1 | 9/2002 | Lazzaro et al. |
| 6,473,115 B1 | 10/2002 | Harmon |
| 6,529,209 B1 | 3/2003 | Dunn et al. |
| 6,608,652 B1 | 8/2003 | Yamazaki et al. |
| 6,674,463 B1 | 1/2004 | Just et al. |
| 6,678,091 B2 | 1/2004 | Tropper |
| 6,687,399 B1 | 2/2004 | Chuang et al. |
| 6,931,660 B1 * | 8/2005 | Kalluri et al. .................. 725/131 |
| 6,947,014 B2 | 9/2005 | Wooten |
| 6,975,345 B1 | 12/2005 | Lipton et al. |
| 6,980,177 B2 | 12/2005 | Struyk |

(Continued)

FOREIGN PATENT DOCUMENTS

JP 2003/78843 A 3/2003

(Continued)

*Primary Examiner* — Gims Philippe
(74) *Attorney, Agent, or Firm* — Fletcher Yoder (57) ABSTRACT

A device for displaying multiple image streams each comprising multiple image frames that entertains multiple viewers includes at least three image generators for generating at least three separate image streams that each include multiple image frames. At least one of the image generators is configured for at least one viewer input. An image multiplexer is provided for interleaving image frames of each image stream to produce an interleaved image stream and a display is provided for showing the interleaved image stream. A method of displaying multiple image streams is also presented.

20 Claims, 5 Drawing Sheets

U.S. PATENT DOCUMENTS

| | | |
|---|---|---|
| 2001/0028413 A1 | 10/2001 | Tropper |
| 2002/0105483 A1 | 8/2002 | Yamazaki |
| 2003/0118183 A1 | 6/2003 | Struyk |
| 2003/0202015 A1* | 10/2003 | Battles et al. .................. 345/764 |
| 2004/0056948 A1* | 3/2004 | Gibson ........................... 348/56 |
| 2004/0109093 A1 | 6/2004 | Small-Stryker |
| 2004/0246383 A1 | 12/2004 | Alden |
| 2004/0252187 A1 | 12/2004 | Alden |
| 2005/0046700 A1 | 3/2005 | Bracke |
| 2007/0247477 A1* | 10/2007 | Lowry et al. ................... 345/629 |

FOREIGN PATENT DOCUMENTS

| | | |
|---|---|---|
| JP | 2005/136661 A | 5/2005 |
| JP | 2005/157395 A | 6/2005 |
| JP | 2006/71681 A | 3/2006 |

* cited by examiner

| Time (1/180 sec) | L1 | R1 | L2 | R2 | L3 | R3 |
|---|---|---|---|---|---|---|
| 1 | 1 | 0 | 0 | 0 | 0 | 0 |
| 2 | 0 | 1 | 0 | 0 | 0 | 0 |
| 3 | 0 | 0 | 1 | 0 | 0 | 0 |
| 4 | 0 | 0 | 0 | 1 | 0 | 0 |
| 5 | 0 | 0 | 0 | 0 | 1 | 0 |
| 6 | 0 | 0 | 0 | 0 | 0 | 1 |
| 7 | 1 | 0 | 0 | 0 | 0 | 0 |
| 8 | 0 | 1 | 0 | 0 | 0 | 0 |
| 9 | 0 | 0 | 1 | 0 | 0 | 0 |
| 10 | 0 | 0 | 0 | 1 | 0 | 0 |
| 11 | 0 | 0 | 0 | 0 | 1 | 0 |
| 12 | 0 | 0 | 0 | 0 | 0 | 1 |
| 13 | 1 | 0 | 0 | 0 | 0 | 0 |
| 14 | 0 | 1 | 0 | 0 | 0 | 0 |
| 15 | 0 | 0 | 1 | 0 | 0 | 0 |
| 16 | 0 | 0 | 0 | 1 | 0 | 0 |
| 17 | 0 | 0 | 0 | 0 | 1 | 0 |
| 18 | 0 | 0 | 0 | 0 | 0 | 1 |
| 19 | 1 | 0 | 0 | 0 | 0 | 0 |
| 20 | 0 | 1 | 0 | 0 | 0 | 0 |

FIG. 4

| Time (1/180 sec) | L1 | R1 | L2 | R2 | L3 | R3 |
|---|---|---|---|---|---|---|
| 1 | 0 | 1 | 0 | 0 | 0 | 0 |
| 2 | 0 | 0 | 0 | 1 | 0 | 0 |
| 3 | 0 | 0 | 0 | 0 | 0 | 1 |
| 4 | 1 | 0 | 0 | 0 | 0 | 0 |
| 5 | 0 | 0 | 1 | 0 | 0 | 0 |
| 6 | 0 | 0 | 0 | 0 | 1 | 0 |
| 7 | 0 | 1 | 0 | 0 | 0 | 0 |
| 8 | 0 | 0 | 0 | 1 | 0 | 0 |
| 9 | 0 | 0 | 0 | 0 | 0 | 1 |
| 10 | 1 | 0 | 0 | 0 | 0 | 0 |
| 11 | 0 | 0 | 1 | 0 | 0 | 0 |
| 12 | 0 | 0 | 0 | 0 | 1 | 0 |
| 13 | 0 | 1 | 0 | 0 | 0 | 0 |
| 14 | 0 | 0 | 0 | 0 | 0 | 0 |
| 15 | 0 | 0 | 1 | 0 | 0 | 1 |
| 16 | 1 | 0 | 0 | 0 | 0 | 0 |
| 17 | 0 | 0 | 1 | 0 | 0 | 0 |
| 18 | 0 | 0 | 0 | 0 | 1 | 0 |
| 19 | 0 | 1 | 0 | 0 | 0 | 0 |
| 20 | 0 | 0 | 0 | 1 | 0 | 0 |

FIG. 5

| Time (1/180 sec) | L1 | R1 | L2 | R2 | L3 | R3 |
|---|---|---|---|---|---|---|
| 1 | 0 | 0 | 0 | 0 | 0 | 1 |
| 2 | 0 | 0 | 0 | 0 | 1 | 0 |
| 3 | 0 | 1 | 0 | 0 | 0 | 0 |
| 4 | 1 | 0 | 0 | 0 | 0 | 0 |
| 5 | 0 | 0 | 0 | 1 | 0 | 0 |
| 6 | 0 | 0 | 1 | 0 | 0 | 0 |
| 7 | 0 | 0 | 0 | 0 | 0 | 1 |
| 8 | 0 | 0 | 0 | 0 | 1 | 0 |
| 9 | 0 | 1 | 0 | 0 | 0 | 0 |
| 10 | 1 | 0 | 0 | 0 | 0 | 0 |
| 11 | 0 | 0 | 0 | 1 | 0 | 0 |
| 12 | 0 | 0 | 1 | 0 | 0 | 0 |
| 13 | 0 | 1 | 0 | 0 | 0 | 1 |
| 14 | 0 | 0 | 0 | 0 | 1 | 0 |
| 15 | 0 | 1 | 0 | 0 | 0 | 0 |
| 16 | 1 | 0 | 0 | 0 | 0 | 0 |
| 17 | 0 | 0 | 0 | 1 | 0 | 0 |
| 18 | 0 | 0 | 1 | 0 | 0 | 0 |
| 19 | 0 | 0 | 0 | 0 | 0 | 1 |
| 20 | 0 | 0 | 0 | 0 | 1 | 0 |

TIME-SLICED MULTIPLEXED IMAGE DISPLAY

CROSS REFERENCE TO RELATED APPLICATIONS

This application claims benefit of U.S. Provisional Patent Application Ser. No. 60/799,298, filed May 10, 2006, entitled "Time-Sliced Multiplexed Image Display System" the entire contents of which is incorporated herein by reference to the extent necessary to make and use the present invention.

BACKGROUND OF THE INVENTION

The field of the invention relates to motion picture display and viewing, and in particular, to a new and useful apparatus and method for displaying multiple image streams for individual viewers to perceive only a selected subset of the total set of projected image streams. The invention is well suited for use in amusement parks or theme parks, as well as in movie theaters and other places where display screens are used.

A conventional television show or theatrical film or other "moving picture" display is comprised of multiple still images shown in rapid succession on a screen or other display surface. Typically, the still images forming a moving picture are displayed at a rate of about 24-30 frames per second and are often synchronized with sound. The images impart the effect of motion because the human eye cannot perceive distinct changes in frames at rates greater than about 20 frames per second and blur the changes into the illusion of motion. Similarly, the human eye does not perceive flickering at rates above approximately 50 frames per second due to visual persistence. The above phenomenon has been used since the beginning of the 20th century to produce moving pictures, or movies. Thomas Edison, the inventor of the motion picture camera, needed to balance the needs of human perception with the need to minimize the amount of film that needed to be taken. He determined experimentally that 10 frames per second sufficed to provide the illusion of continuous motion. He also determined that viewers were quite annoyed by 10 flashes per second caused by the shutter opening and closing to accommodate motion of the film between looks. This phenomenon was simply addressed by having the shutter open and close three times for each single motion of the film, producing a 30 flash per second presentation that was well received by viewers.

Now, when a group of viewers watch a conventional television or movie theater screen, they each see the same image stream and have the same viewing experience. The display produces only a single image that is shared by the entire group viewing the screen.

Three-dimensional, or 3D, displays which have two different images forming a stereoscopic image in a single frame are also popular. The images can be separated by light polarization for projected images, or color, or via time-sequenced shuttering equipment. For images separated by polarization, one method would be for images for each eye to be polarized orthogonally to one another. The viewer is given polarized lenses to look through, which are coordinated with the projected image polarization for that eye, such that only the intended image reaches each eye. For images separated by color, each component of the stereoscopic image is presented in a different color within a single frame. For images that are time sequenced, a shuttering system presents the left and right images sequentially, and the observer wears glasses with shuttering mechanisms synchronized with the projection such that light is allowed to pass only when the appropriate image is illuminated. A person wearing glasses with lenses designed to filter images for each eye views the component images of the frame, one per eye, and human vision recombines the images into a single image having a three-dimensional appearance. A 3D image may look discolored and distorted when viewed without the appropriate aforementioned filtering mechanisms. Similar to conventional 2D images on a movie theater or television screen or other projection surface, observers viewing a conventional 3D display all see the same image.

It is important in the field of theme parks and amusements to create individual or personal experiences for guests. Large projection screens with image streams are used to immerse a large number of guests in a themed environment at one time. Each guest views the same images projected onto the screen as is seen by all the other guests in the venue. Each guest has a limited interactive experience in such a setting because of the number of people simultaneously having identical experiences. Additionally, were interactive components for each guest in a large audience to be displayed simultaneously, causing many individual interactive elements to share the same screen space simultaneously, confusion and a greatly diminished guest experience would result. Furthermore, sequencing interactive elements on a large audience display is not usually possible, as the total experience time may be as short as two to three minutes in a typical theme park venue.

One method for presenting multiple users in a group with individual viewing experiences is to use virtual reality (VR) glasses. VR glasses typically present each user with a single image directly in front of their eyes, with all other surroundings blocked out by the VR glasses. VR glasses can be used to present different images to each individual in a small group since the input for the VR glasses can be made unique. However, VR glasses are impractical for use with large crowds of people due to the cost and volume of equipment required. The equipment must be unusually mechanically robust to resist abuse by guests and other wear and tear damage, and sanitizing between uses is logistically difficult and reduces equipment life. Further, it is difficult for individuals wearing the headsets to share the experience, as the glasses block out all surroundings.

Presently, no desirable methods exist for effectively creating different shows or experiences for individuals or smaller groups in larger crowds. Accordingly, a need exists for being able to create different shows or environments for individual guests or small selected groups of guests within a larger group on the same display screen to create satisfying personal experiences for each guest, and to thereby enhance the overall theme park or amusement experience.

BRIEF DESCRIPTION OF THE INVENTION

A device for displaying multiple image streams comprising multiple image frames that entertains multiple viewers comprises at least three image generators for generating at least three separate image streams each comprising multiple image frames and wherein at least one image generator is configured for at least one viewer input. An image multiplexer is provided for interleaving the image frames of each image stream to produce an interleaved image stream and a display is provided for showing the interleaved image stream.

According to one particular aspect of the invention, a filtering mechanism is also provided that comprises at least one shutter that is synchronized to the display of the desired frames in the interleaved image stream. The filtering mechanism is interposed between the viewer and display medium.

In another particular aspect of the invention, the interleaved image stream is superimposed on a background image stream that is visible to all viewers. When multiple image projectors are used to combine the images for viewers, the images from other projectors may be subtracted out prior to projection so as not to cause distortion in the combined image. The combination of a background image stream and a selected subset of filtered image streams is passed by the viewer's filtering mechanism, such as a shuttering filter.

In another embodiment of the invention, a method of displaying multiple image streams comprising multiple image frames for entertaining multiple viewers, comprises generating at least three separate image streams each comprising multiple image frames and providing for input from at least one viewer to one of the separate image streams; interleaving image frames of each image stream to produce an interleaved image stream; and displaying the interleaved image stream.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended to show the complete range of ways the invention can be made and used. Changes to and substitutions of the various components of the invention can of course be made. The invention resides as well in sub-combinations and sub-systems of the elements described, and in methods of using them.

DETAILED DESCRIPTION OF THE INVENTION

Figure 1:
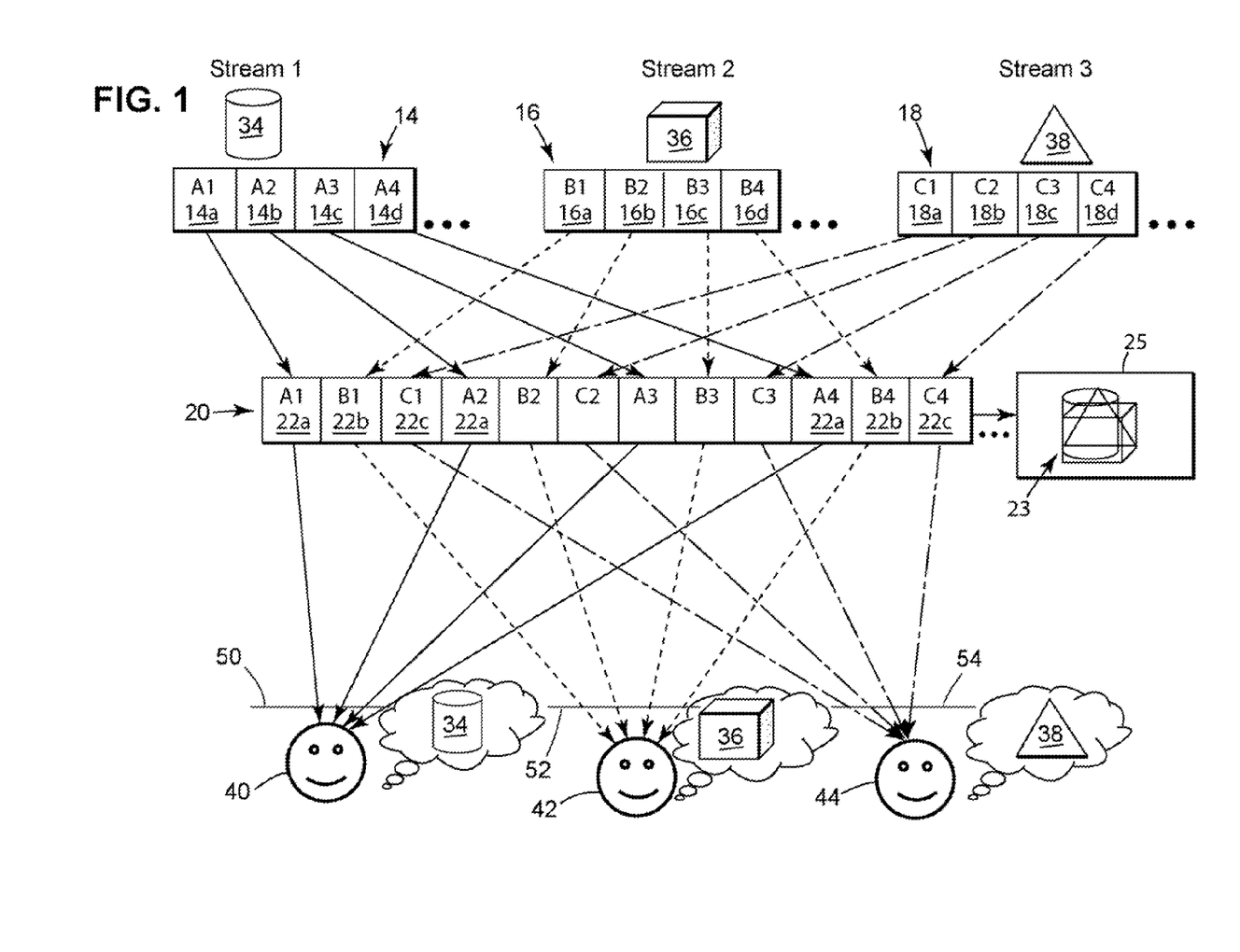
FIG. 1 is a schematic of a display system in accordance with one embodiment of the invention.

Referring now to the drawings in which like reference numerals are used to indicate the same or related elements, FIG. 1 illustrates a display system in which images 34, 36, 38 are depicted in image streams 14, 16, 18, respectively, for combining into a single interleaved image stream 20. Each of the image streams 14, 16, 18 comprise multiple frames A1 through A4, labeled 14a-d, B1 through B4, labeled 16a-d, C1 through C4, labeled 18a-d, respectively. The interleaved image stream 20 comprises multiple image frames labeled as 22a-c, repetitively, which correspond to particular image frames from each image stream 14, 16 and 18, respectively. It should be noted that the image 34, 36, 38 in each stream 14, 16, 18 may change between frames 14a-d, 16a-d, 18a-d, or it may remain constant for a period of time; in order to impart the illusion of motion, the images 34, 36, 38 change with time. Each stream 14, 16, 18 may have any number of frames. It is preferable that each stream 14, 16, 18 have the same number of frames so that the interleaved image stream 20 displays an image for each stream until the interleaved image stream 20 ends. Further, while three separate image streams 14, 16, 18 are illustrated, the number should not be seen as limiting; as few as two independent image streams 14, 16 may be employed, or multiple streams may be combined to form the interleaved image stream 20. The image streams 14, 16, 18 may be combined in any order in the interleaved image stream 20; that is, it is not essential that the order is 1, 2, 3, 1, 2, 3. The order of the combined images 14a-d, 16a-d, 18a-d is only limited by the fact that a certain number of images from one of the image streams 14, 16, 18 must be presented to a viewer each second with high enough frequency to avoid visible frame changes or flickering, and any filtering mechanism 50, 52, 54 is synchronized to the image frame 14a-d, 16a-d, 18a-d display order.

As illustrated in FIG. 1, images 34, 36, 38 represent three different objects—a cylinder, a cube and a triangle. As will be explained further herein, the images 34, 36, 38 presented can all be two-dimensional, in 3D form, or a combination of image types. Thus, for example, the cylinder 34 and cube 36 images may be presented in 2D or 3D, while the triangle 38 is a 2D image. As explained below, the viewers 40, 42, 44 are each provided with means for viewing a 2D or a 3D image and the system is operated accordingly.

The frames 14a-d, 16a-d, 18a-d forming the image of each object are combined in a predetermined manner to produce the interleaved image stream 20. If the interleaved image stream 20 is viewed without filtering, a composite, incoherent, image 23 appears on display media 25. Display media 25 may be a video screen, a projection screen, a television or computer monitor or another device capable of displaying the interleaved image stream 20. In one alternative, the display media 25 may be a lenticular lens, so that multiple images can be projected at once in the image stream 20, and the lens separates the images for viewers at different physical positions relative to the lens.

Three viewers 40, 42, 44 are shown in FIG. 1 who each view the interleaved image stream 20. A filter mechanism 50, 52, 54 is interposed between each viewer 40, 42, 44 and the display media 25. The filter mechanisms 50, 52, 54 are operated so that each viewer 40, 42, 44 sees only one of the images in the interleaved image stream 20. The filter mechanisms 50, 52, 54 are shuttering devices that can be implemented as any of optical, electro-optical, mechanical or electromechanical, chemical and electro-chemical. The mechanisms 50, 52, 54 can be composed solely of or include polarization or other filtering. When the filter mechanisms 50, 52, 54 are shuttered, no image passes, while when the shutter is opened, an image is visible by the eyes of the respective viewer 40, 42, 44. Each of the filter mechanisms 50, 52, 54 includes a synchronization device for synchronizing the shuttering of the filter mechanism with the display of one of the image streams 14, 16, 18 in the interleaved image stream 20, so that only the selected image stream 14, 16, 18 is visible on the display media 25 as viewed through the particular filter mechanism 50, 52, 54. The display time for each frame 22a-c in the interleaved image stream is selected to ensure viewers 40, 42, 44 can still interpret the image 34, 36, 38 displayed on the display media 25. For example, in the case of the three images 34, 36, 38 combined into the interleaved image stream 20, each frame 22a-c can be displayed for about $\frac{1}{90}$ second. The filtering mechanism 50, 52, 54 for each viewer 40, 42, 44 is synchronized to pass the appropriate image frame 22a-c at the correct time for each viewer and to prevent image frames 22a-c from other ones of the image streams 14, 16, 18 from being seen. Polarizing filters combined with shutters can be used to double the effective frame rate.

Again, as with the number of image streams 14, 16, 18 interleaved, the number of viewers 40, 42, 44 illustrated in FIG. 1 should not be seen as limiting. Any number of viewers 40, 42, 44 may view each one of the image streams 14, 16, 18 contained in the interleaved image stream 20. Viewers 40, 42, 44 may all view the same filtered image 34, 36, 38, or they may each view a different one, and other, different image streams can be provided for additional viewers to view. Viewers 40, 42, 44 may view a common filtered image 34, 36, 38 through a shared filter mechanism 50, 52, or 54, or though individual filter mechanisms. Filter mechanisms 50, 52, 54 include, among other things, self-supported panels or windows containing active shutters, and headwear, including goggles or glasses with active shutter lenses. Optionally, filter mechanisms 50, 52, 54 can be electro-optical systems or polarizing filters. It should be noted that the system does not require a given image 34, 36, 38 in the interleaved image stream 20 to be viewed by any viewer.

Figure 2:
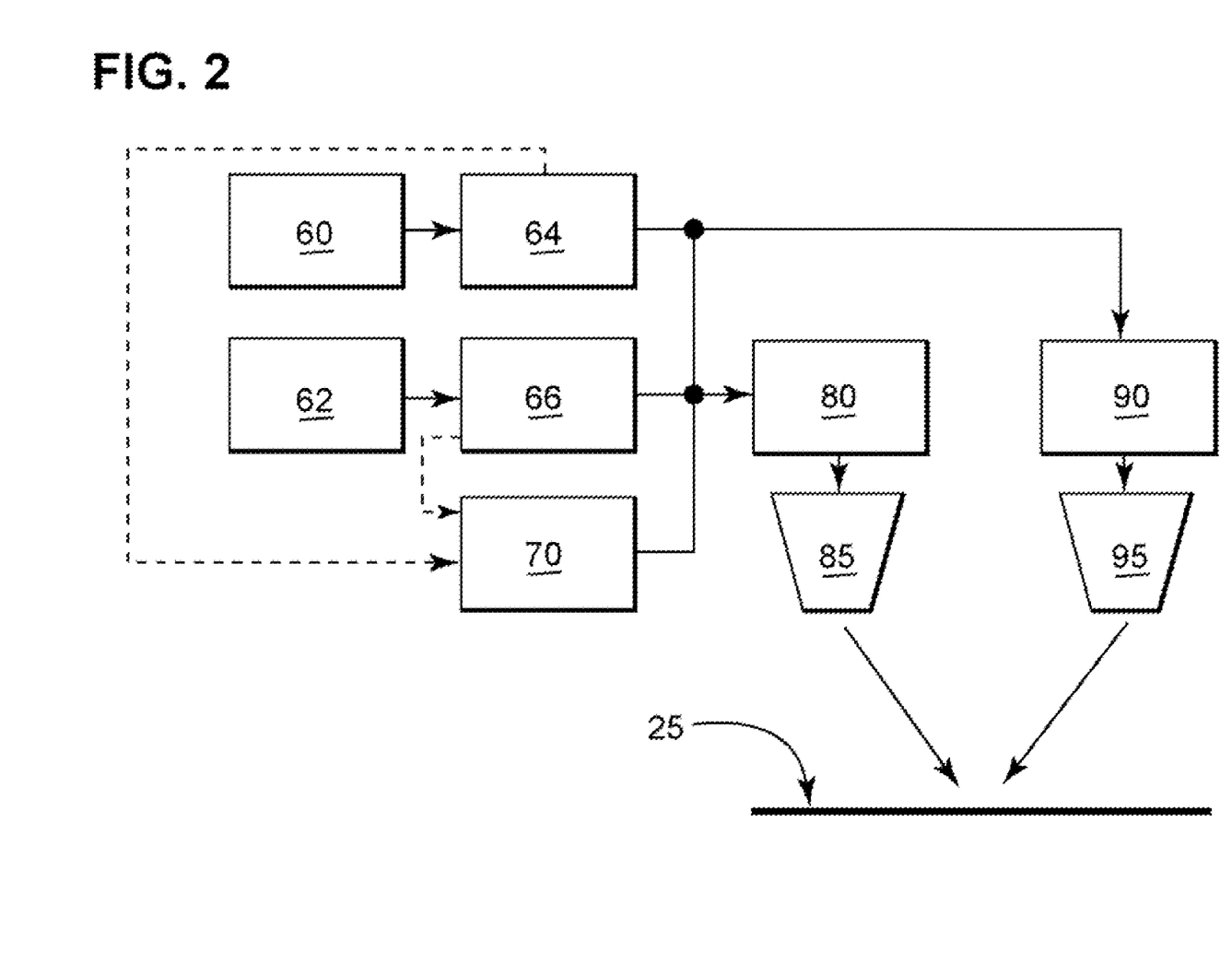
FIG. 2 is a schematic of a display system in accordance with a further embodiment of the invention.

Referring now also to FIG. 2 illustrates an optional embodiment of the invention shown in FIG. 1 in which two image display drivers or projectors 85, 95 are provided and the outputs are combined on display media 25. The term projector is intended to include other image display devices used to produce an image upon a surface, including LCD and plasma monitors, among others. Projectors 85, 95 may be capable of displaying images at frame rates of 30 frames/sec and higher, including about 150 frames/second or more.

In FIG. 2, the common image projector 95 receives a single image signal from source 90 for display on display media 25. The image signal from source 90 is not interleaved. All viewers in the system see the same image produced by projector 95. A multiple image projector 85 receives a signal containing multiple images from image multiplexer 80 for display on the display media 25 in combination or overlay with the image from common image projector 95. Image multiplexer 80 combines signals from three sources 64, 66, 70. Source 70 produces an image stream that is responsive to user inputs 60, 62. Sources 64, 66 are real time image generators which use inputs from interactive inputs 60, 62 to generate image displays to combine with the image stream from source 70 and produce an interleaved image stream 20. It will be understood that source 70 may be responsive to the sources 64, 66 in that various changes to a story line may occur based on one or more viewer's input. This optional feature is reflected in the connection illustrated in broken line between sources 64, 66 and source 70.

In order to display the images from projectors 85, 95 properly to viewers, the non-interleaved frame rate from common image projector 95 can be adjusted so that each frame is displayed for the same amount of time as one cycle of interleaved frames from the multiple image projector 85. That is, the image from common image projector 95 is displayed for the same amount of time as it takes to display one frame for each of the interleaved image streams combined by the image multiplexer 80. When a viewer watches the combined images from the common image projector 95 and the multiple image projector through a filter mechanism 50, the viewer sees a selected image stream from the multiple image projector. It should be noted that in order for each viewer to see the correct combined image, the images from sources 64, 66, and 70 may be subtracted from the image source 90 sent to projector 95. That is, projector 95 presents the common background image with holes or blank space where the images from sources 64, 66, 70 are projected to produce the combined image. The image subtraction is necessary so that viewers do not see color-distorted images on display media 25.

As an example, the invention as illustrated by FIG. 2 can be used to provide an interactive experience in which a guest at an entertainment attraction provides the user input 60 or 62 to the system. The user input 60, 62 drives real-time image generator 64, 66 to produce an image stream that can be multiplexed and displayed. In one embodiment, the user inputs can be gaming guns for simulating targeting and shooting target objects in an image stream displayed on the display media 25. The image multiplexer 80 combines images of targets generated by the responsive source 70 with images corresponding to "shots" fired by the gaming guns (user inputs 60, 62). The multiplexed image stream combines the user input generated images 64, 66 with the responsive source image 70 into a single stream. As shown in FIG. 2, if there are two users each with one of the user inputs 60, 62, images corresponding to their shots can be interleaved in the multiplexed image stream, and the users can be outfitted with filter mechanisms 50, 52, 54 so that they each see only their own shots, even though they are playing on the same display media 25. The multiplexed image stream is projected or displayed by projector 85 concurrently with, for example, a background image generated from source 90 and projected or displayed by projector 95.

Referring again to FIG. 1, in a still further embodiment, the image streams 14, 16, 18 are composed of frames 14*a-d*, 16*a-d*, 18*a-d* that produce three-dimensional images. The frames are divided into left eye and right eye images as is known when creating three-dimensional images; that is, one set of frames is intended to be seen by a viewer's left eye only, while the other set of frames are to be seen only by the viewer's right eye. The frames of each image stream 14, 16, 18 are arranged so that when they are interleaved, the corresponding left and right eye images for each viewer are displayed consecutively. Filter mechanisms 50, 52, 54 are provided to each viewer 40, 42, 44 which selectively expose only one of the viewer's eyes at a time in synchronization with the desired image stream so that each viewer sees a three-dimensional image. The filter mechanisms 50, 52, 54 may use polarization or electrical or mechanical shuttering or some combination thereof to block or pass a desired image.

Figure 3:
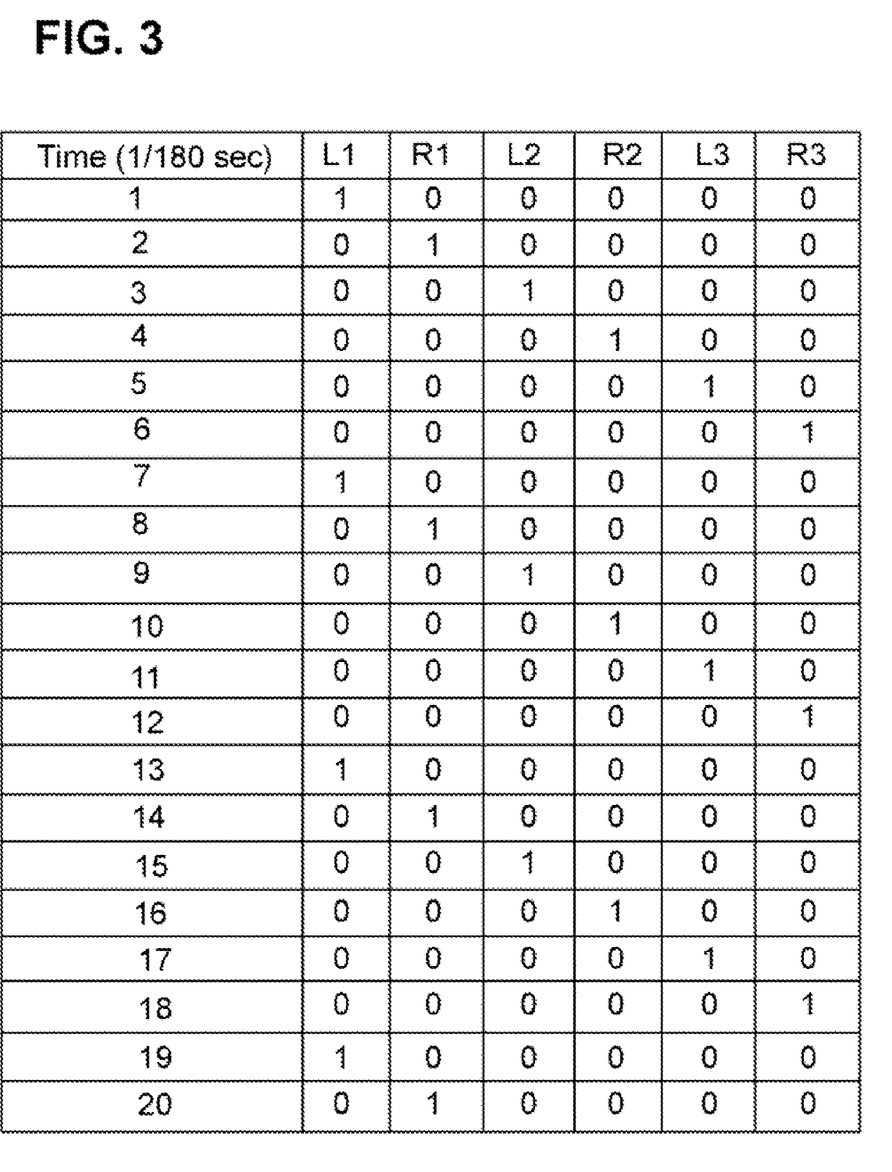
FIG. 3 is a timing chart in accordance with another embodiment of the invention.

FIG. 3 is a timing chart showing the status of a shutter L1, R1; L2, R2; L3, R3 for each lens of a viewer's filtering mechanism 50, 52, 54. In the timing chart, a "0" indicates the shutter is closed, while a "1" indicates the shutter is open. As can be seen, only one shutter L1, R1; L2, R2; L3, R3 of the six in the example is opened at any one time. The shutters L1, R1; L2, R2; L3, R3 are opened sequentially in the same order that the corresponding image stream frames are displayed. The opening of a selected shutter L1, R1; L2, R2; L3, R3 is synchronized to the corresponding image frame. For example, the first stream, left eye image is displayed at time 1 while shutter L1 is open, followed by the first stream, right eye image at time 2 while shutter R1 is open, then the second stream, left eye image is displayed at time 3 as shutter L2 is open, and so on. Alternatively, the left and right eye image frames for the image streams can be interleaved so that all left eye image frames are displayed, followed by all right eye image frames. Other image interleaving patterns are possible as well.

As indicated in FIG. 3, for three viewers, each shutter can be opened for about $1/180$ second, during which time the corresponding image frame of the interleaved three-dimensional image stream is displayed on display media 25. In a three viewer system, such as diagrammed in FIGS. 1 and 3, each viewer sees a filtered image in each eye for $1/180$ second and each viewer's eye is exposed to a new image every $1/30$ second, for a frame rate of 30 frames per second for each viewer.

In a further alternative, the three dimensional image streams could be used in the interactive system of FIG. 2. In such case the filters 50, 52, 54 are adapted to incorporate separate lenses with independent shutters L1, R1; L2, R2; L3, R3 for each eye of a viewer, and the shutters are operated as shown in FIG. 3. As a result, a three-dimensional image is seen by each viewer overlaid on a common or background image from source 90. A three-dimensional individual interactive experience is thereby provided using a single display media.

Figure 4:
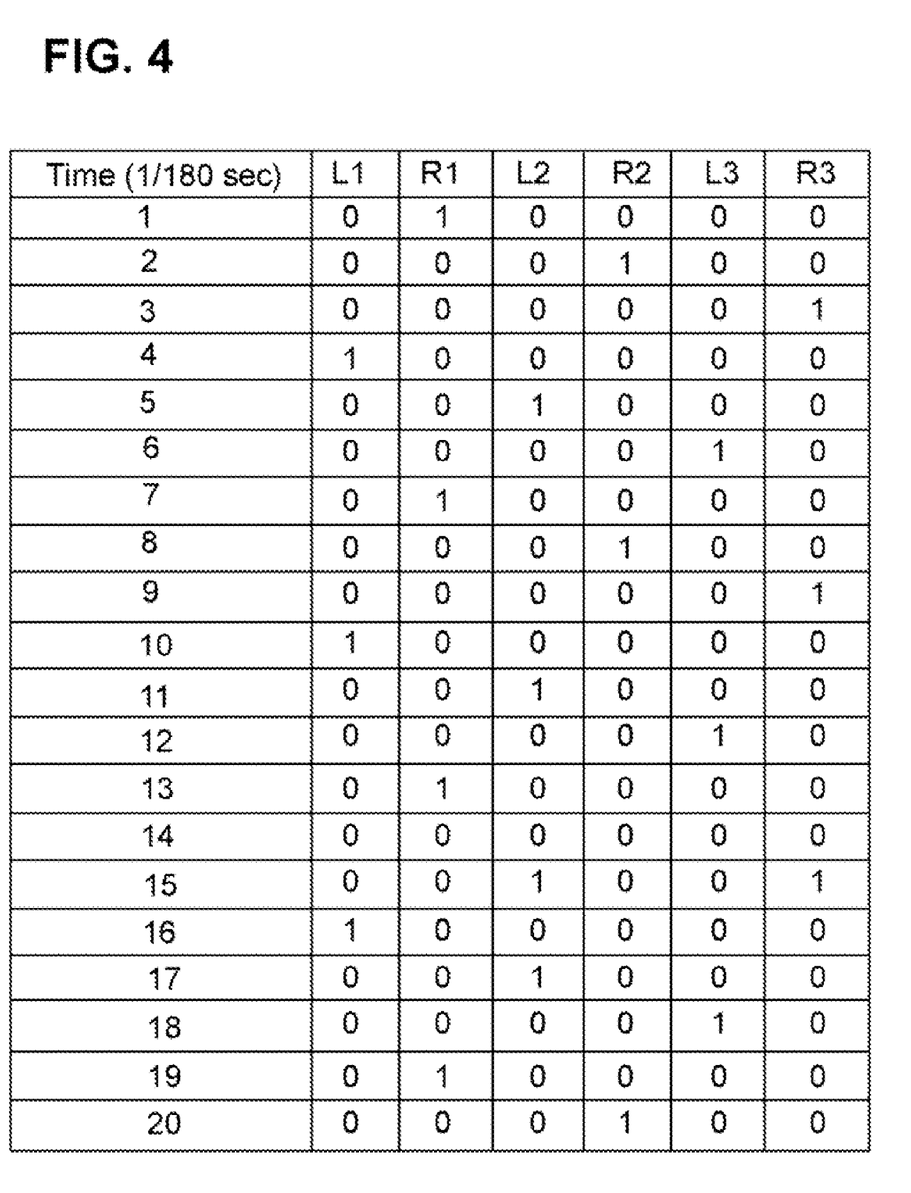
FIG. 4 is a timing chart showing an alternative embodiment of the invention.
Figure 5:
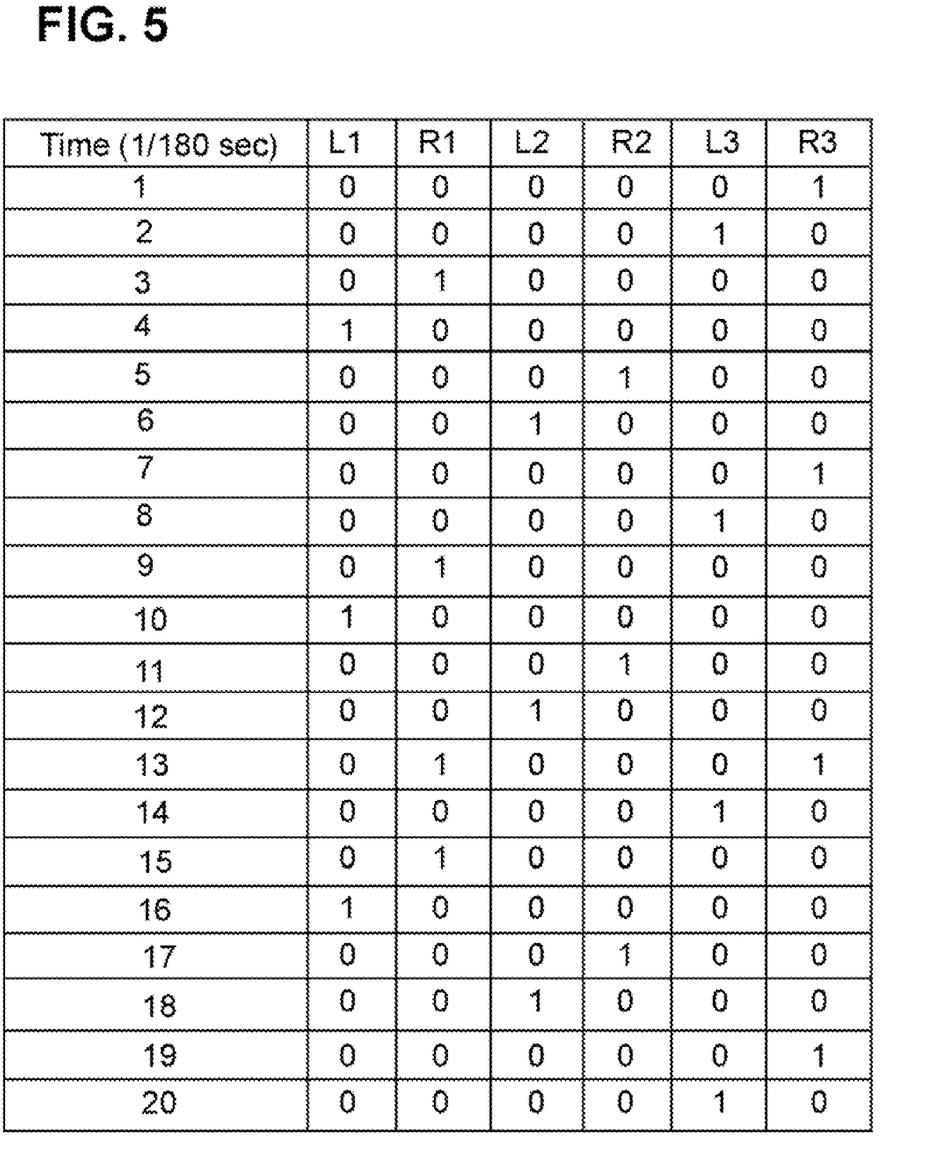
FIG. 5 is a timing chart illustrating a still further alternative embodiment of the invention.

FIGS. 4 and 5 illustrate further timing charts using different sequences for opening and closing the shutters L1, R1; L2, R2; L3, R3. As can be seen in FIG. 4, the shuttering order starts with the right shutter, R1 instead of the left shutter L1, and is then followed in sequence by R2 and R3. The left lenses L1, L2, L3 are then opened in order after the right lenses R1, R2, R3. In FIG. 5, the shutter opening starts with R3, followed by L3, then R2, L2 and R1, L1 in order. Thus, it should be clear that the only restriction on the order of operation of the shutters is simply that one side of a filter mechanism 50, 52, 54 should not shutter twice before the other side shutters once, so that each viewer's eye is exposed to coordinated images for a given frame.

While the present invention has been described with references to preferred embodiments, various changes or substitutions may be made on these embodiments by those ordinarily skilled in the art pertinent to the present invention without departing from the technical scope of the present invention. Therefore, the technical scope of the present invention encompasses not only those embodiments described above, but all that fall within the scope of the appended claims.

What is claimed is:

1. A method of displaying multiple image streams for entertaining multiple viewers, comprising:
    generating an interleaved image stream from a plurality of image sources, wherein the interleaved image stream comprises a plurality of cycles that each comprise a plurality of image frames;
    generating a common image frame corresponding to each of the plurality of cycles of the interleaved images stream, wherein each common image frame is generated by combining the plurality of image frames of the corresponding cycle and then subtracting portions that are not common to the plurality of image frames of the particular cycle to produce one or more blank spaces;
    projecting each corresponding common image frame onto a display using a first projector while projecting, into the one or more blank spaces of each projected common image, the corresponding cycle of the interleaved image stream using a second projector.

2. The method of claim 1, wherein each cycle of the interleaved image steam comprises one image frame from each of the plurality of image sources.

3. The method of claim 1, comprising filtering portions of each cycle of the projected interleaved image stream so that one or more of the plurality of images of each cycle are not viewed by at least one of the multiple viewers.

4. The method of claim 3, wherein filtering the displayed interleaved image stream comprises using one or more polarized lenses to filter the projected interleaved image stream.

5. The method of claim 3, wherein filtering comprises using a plurality of shutters configured to open and close for a predetermined period of time, wherein the period of time is synchronized with a frame rate of the interleaved image stream.

6. The method of claim 5, wherein each of the plurality of shutters is open for approximately ¹⁄₁₈₀ second and the frame rate is approximately thirty frames per second.

7. The method of claim 1, wherein the interleaved image stream comprises an interleaved image stream configured for displaying two-dimensional images.

8. The method of claim 1, wherein the interleaved image stream comprises an interleaved image stream configured for displaying three-dimensional images.

9. The method of claim 1, wherein the plurality of image sources are configured to receive input from at least one of the multiple viewers.

10. The method of claim 9, wherein one or more of the plurality of image sources are configured to change a story line of the interleaved image stream based on the input received from at least one of the multiple viewers.

11. A system for displaying multiple image streams that entertains multiple viewers, comprising:
    an image multiplexer configured to interleave at least three image streams to produce an interleaved image stream comprising a plurality of cycles, wherein each cycle of the interleaved image stream comprises a plurality of image frames;
    an image source configured to generate a background image frame corresponding to each of the plurality of cycles of the interleaved image stream, wherein each background image frame includes common portions of the plurality of image frames of the corresponding cycle and includes blank spaces for dissimilar portions of the plurality of image frames of the corresponding cycle;
    a first projector configured to project each background image frame on a display; and
    a second projector configured to project each corresponding cycle of the interleaved image stream into the blank spaces of each projected background image frame on the display.

12. The system of claim 11, wherein each cycle of the interleaved image steam comprises one image frame from each of the at least three image streams.

13. The system of claim 12, comprising multiple filtering mechanisms respectively utilized by the multiple viewers, wherein each filtering mechanism is configured to allow each of the multiple viewers to view only a portion of each cycle of the interleaved image stream.

14. The system of claim 13, wherein the filtering mechanism comprises polarized lenses and a plurality of shutters that open and close for a different predetermined period of time that is synchronized with a frame rate of the interleaved image stream.

15. The system of claim 14, wherein each of the plurality of shutters of each of the multiple filtering mechanisms is open for approximately ¹⁄₁₈₀ second.

16. The system of claim 14, wherein the frame rate of the interleaved image stream is approximately thirty frames per second.

17. The system of claim 11, wherein the interleaved image stream comprises an interleaved image stream configured for displaying three-dimensional images.

18. The system of claim 11, comprising at least three image sources configured to generate the at least three image streams, wherein each of the at least three image sources is configured to receive input from at least one of the multiple viewers.

19. The system of claim 18, wherein the at least three image sources are configured to varying a story line of each image stream based on input received from at least one of the multiple viewers.

20. The system of claim 18, comprising multiple user input devices respectively associated with the multiple viewers, wherein each of the multiple user input devices is configured to provide the input from at least one of the multiple users to one or more of the at least three image sources.

* * * * *